US010505219B2

(12) United States Patent
Singh et al.

(10) Patent No.: US 10,505,219 B2
(45) Date of Patent: Dec. 10, 2019

(54) ARTIFICIAL SEI TRANSPLANTATION

(71) Applicants: Toyota Motor Engineering & Manufacturing North America, Inc., Erlanger, KY (US); Deakin University, Geelong, Victoria (AU)

(72) Inventors: Nikhilendra Singh, Ypsilanti, MI (US); Timothy S. Arthur, Ann Arbor, MI (US); Kensuke Takechi, Ann Arbor, MI (US); Patrick Howlett, Box Hill South (AU); Maria Forsyth, Ashburton (AU); Robert Kerr, Croydon South (AU)

(73) Assignees: Toyota Motor Engineering & Manufacturing North America, Inc., Plano, TX (US); Deakin University, Victoria (AU)

( * ) Notice: Subject to any disclaimer, the term of this patent is extended or adjusted under 35 U.S.C. 154(b) by 223 days.

(21) Appl. No.: 15/606,803

(22) Filed: May 26, 2017

(65) Prior Publication Data

US 2018/0342773 A1    Nov. 29, 2018

(51) Int. Cl.
*H01M 10/0525* (2010.01)
*H01M 4/04* (2006.01)
*H01M 4/13* (2010.01)
*H01M 4/139* (2010.01)
*H01M 10/0569* (2010.01)
(Continued)

(52) U.S. Cl.
CPC ..... *H01M 10/0525* (2013.01); *H01M 4/0452* (2013.01); *H01M 4/13* (2013.01); *H01M 4/139* (2013.01); *H01M 4/366* (2013.01); *H01M 10/0568* (2013.01); *H01M 10/0569* (2013.01)

(58) Field of Classification Search
CPC ......... H01M 10/4235; H01M 10/0568; H01M 10/0569
See application file for complete search history.

(56) References Cited

U.S. PATENT DOCUMENTS

| 6,344,293 B1 * | 2/2002 | Geronov | H01M 4/602 |
| | | | 429/213 |
| 2007/0042271 A1 * | 2/2007 | Nishida | C07D 207/08 |
| | | | 429/306 |

(Continued)

OTHER PUBLICATIONS

Lane, G.H., "Ionic Liquid Electrolyte for Lithium Metal Batteries: Physical, Electrochemical, and Interfacial Studies of N-Methyl-N-butylmorpholinium Bis(fluorosulfonyl)imide," J. Phys. Chem. C, 114, pp. 21775-21785 (2010).

(Continued)

*Primary Examiner* — Jonathan G Jelsma
(74) *Attorney, Agent, or Firm* — Christopher G. Darrow; Darrow Mustafa PC

(57) ABSTRACT

An anode for a Li-ion cell, protected with an SEI by pre-treatment in an SEI-formation cell, is stable for cell cycling even in the presence of substantial water in the cell electrolyte. A method for making the protected anode includes forming an SEI on a lithium electrode by performing multiple charge/discharge cycles on the electrode in a first cell having an SEI formation electrolyte to produce the protected anode. The SEI formation electrolyte includes an ionic liquid having at least one of eight organic cations.

18 Claims, 9 Drawing Sheets

(51) Int. Cl.
*H01M 10/0568* (2010.01)
*H01M 4/36* (2006.01)

(56) References Cited

U.S. PATENT DOCUMENTS

| | | | | |
|---|---|---|---|---|
| 2008/0094777 | A1* | 4/2008 | Itahashi | H01G 9/038 |
| | | | | 361/502 |
| 2013/0345380 | A1* | 12/2013 | Schmidt | C08F 2/38 |
| | | | | 526/193 |
| 2014/0212772 | A1* | 7/2014 | Nakamoto | H01M 10/0568 |
| | | | | 429/403 |
| 2016/0126582 | A1 | 5/2016 | Xiao et al. | |
| 2018/0062206 | A1* | 3/2018 | Yang | H01M 4/134 |

OTHER PUBLICATIONS

Mizuno, F., et al., "Water in Ionic Liquid for Electrochemical Li Cycling," ACS Energy Lett., 1, pp. 542-547 (2016).
Girard et al., Electrochemical and physiochemical properties of small phosphonium cation ionic liquid electrolytes with high lithium salt content, Phys. Chem. Chem. Phys., 17, pp. 8706-9713 (2015).
Pozo-Gonzalo, C. et al., Enhanced performance of phosphonium based ionic liquids towards 4 electrons oxygen reductin reaction upon addition of a weak proton source, Electrochemistry Communications 38 (2014) pp. 24-27.
Pozo-Gonzalo, C. et al., Insights into the reversible oxygen reduction reaction in a series of phosphonium-based ionic liquids, Phys. Chem. Chem. Phys., 2014, 16, pp. 25062-25070.

* cited by examiner

ARTIFICIAL SEI TRANSPLANTATION

TECHNICAL FIELD

The present disclosure generally relates to electrodes for rechargeable batteries and, more particularly, to electrodes having preformed solid-electrolyte interphases.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Water reacts spontaneously with lithium metal, presenting a difficulty for aqueous lithium battery technology. In addition, it is known that common organic electrolytes for Li batteries do not function well in the presence of water. In particular, any water in these electrolyte results in cell failure.

Batteries are commonly known to form solid-electrolyte interphases (SEIs) at the contact points of solid electrodes and liquid electrolytes. These SEIs are often a combination of electrode and electrolyte components, sometimes including decomposition products of said electrolytes. SEIs at times will passivate an electrode, diminishing conductivity. However, at other times, SEIs will also provide a protective layer, stabilizing the electrode against corrosion or other undesired side reactions. No SEI is currently known that enables a lithium anode to undergo stable cycling in the presence of water in the electrolyte.

Accordingly, it would be desirable to provide an improved method for protecting a lithium anode against water in electrolyte.

SUMMARY

This section provides a general summary of the disclosure, and is not a comprehensive disclosure of its full scope or all of its features.

In various aspects, the present teachings provide a method for preparing a lithium-ion cell having a protected anode with a pre-formed solid electrolyte interphase (SEI). The method includes a step of forming an SEI on a lithium electrode by performing multiple charge/discharge cycles on the electrode in a first cell having an SEI formation electrolyte to produce the protected anode. The SEI formation electrolyte includes an FSI anion; and a cation selected from the group: 1-methyl-1-propylpyrrolidinium; N-methyl-N,N-diethyl-N-propylammonium; N,N-diethyl-N-methyl-N-(2-methoxyethyl)-ammonium; 1,1-ethylpropylpiperidinium; N-methyl-N-(2-methoxyethyl)-pyrrolidinium; trimethylisopropylphosphonium; methyltriethylphosphonium; methyltributylphosphonium; and mixtures thereof. The method further includes a step of assembling a wet Li-ion voltaic cell. The wet Li-ion cell includes the protected anode; and a wet electrolyte in contact with the protected anode. The wet electrolyte includes at least 50 ppm water.

In other aspects, the present teachings provide a method for preparing a protected anode with a pre-formed solid electrolyte interphase. The method includes a step of forming an SEI on a lithium electrode by performing multiple charge/discharge cycles on the electrode in a first cell having an SEI formation electrolyte to produce the protected anode. The SEI formation electrolyte includes an FSI anion; and a cation selected from the group: 1-methyl-1-propylpyrrolidinium; N-methyl-N,N-diethyl-N-propylammonium; N,N-diethyl-N-methyl-N-(2-methoxyethyl)-ammonium; 1,1-ethylpropylpiperidinium; N-methyl-N-(2-methoxyethyl)-pyrrolidinium; trimethylisopropylphosphonium; methyltriethylphosphonium; methyltributylphosphonium; and mixtures thereof.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present teachings provide methods for forming a solid electrolyte interphase (SEI) on an anode of a Li-ion cell, and for transplanting the anode with the formed SEI to a second Li-ion cell. The anode so transplanted can be electrochemically stable when contacting an electrolyte having water in excess of 50 ppm.

The method for forming the SEI includes cycling the anode against an electrolyte that includes Lithium bis(fluorosulfonyl)imide (LiFSI) salt and an ionic liquid. The ionic liquid includes an FSI anion and at least one of eight disclosed organic cations. As shown in the results below, this protects the anode when it is transplanted into the second Li-ion cell having a water-containing electrolyte.

Figure 1:
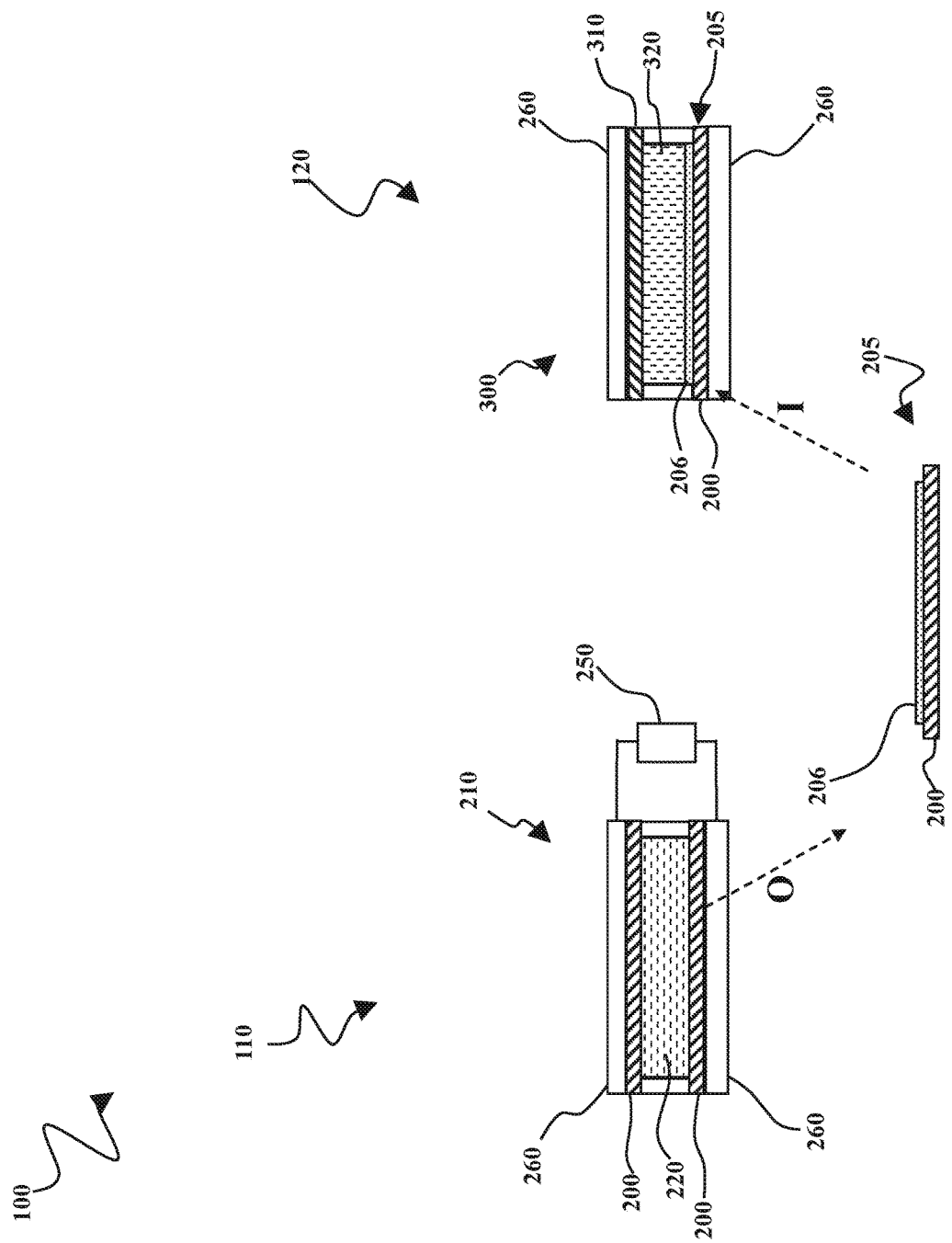
FIG. 1 is a schematic illustration of a method for preparing a Li-ion cell, and also includes schematic illustrations of a first cell used to prepare a protected anode, and a wet Li-ion cell that includes the protected anode.
Figure 2A:
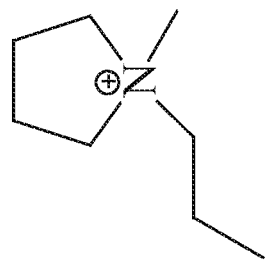
FIGS. 2A-2H are line drawings of organic cations suitable for use in an SEI formation electrolyte that is used in the first cell of FIG. 1.
Figure 2B:
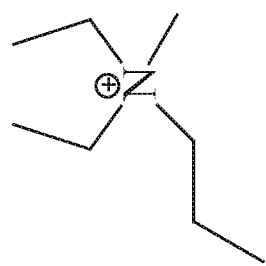
Figure 2C:
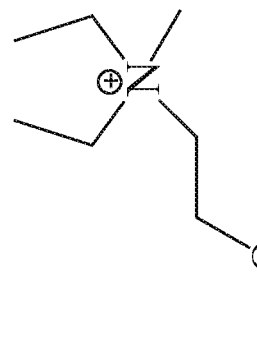
Figure 2D:
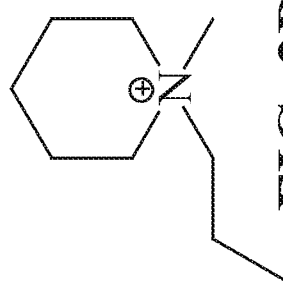
Figure 2F:
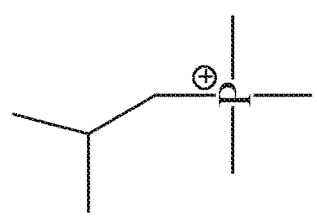
Figure 2H:
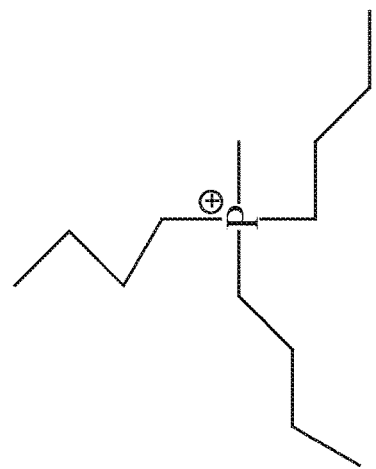
Figure 2E:
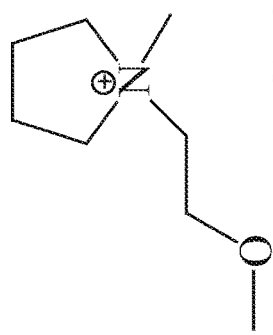
Figure 2G:
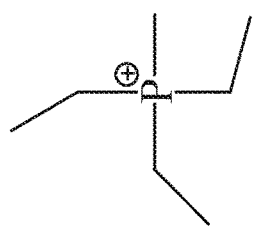

FIG. 1 provides a schematic illustration of a method 100 for making a Li-ion voltaic cell with a water-containing electrolyte is disclosed. The method 100 includes a step 110 of forming an SEI by performing multiple charge/discharge cycles on a lithium electrode 200 in a first cell 210 having an SEI formation electrolyte 220. The forming an SEI step 110 converts the lithium electrode 200 into a protected lithium anode 205. The SEI formation electrolyte 220 includes LiFSI salt, and an ionic liquid. The ionic liquid includes FSI and at least one organic cation from the group including: 1-methyl-1-propylpyrrolidinium (referred to hereinafter as "Pyr13"; FIG. 2A); N-methyl-N,N-diethyl-N-propylammonium (N1223, FIG. 2B); N,N-diethyl-N-methyl-N-(2-methoxyethyl)-ammonium (DEME, FIG. 2C); 1,1-methylpropylpiperidinium (referred to hereinafter as "Pip13", FIG. 2D); N-methyl-N-(2-methoxyethyl)-pyrrolidinium (Pyr12$_O$1, (FIG. 2E); trimethylisopropylphosphonium (P111,4, FIG. 2F); methyltriethylphosphonium (P1222, FIG. 2G); methyltributylphosphonium (P1444, FIG. 2H); and mixtures thereof.

In some implementations, the SEI formation electrolyte will include LiFSI present at a molar ratio, relative to ionic liquid of: at least 1:5; or at least 1:2, or at least 1:1. In some implementations, the SEI formation electrolyte 220 will include LiFSI present at its saturation point in the ionic liquid (i.e. the SEI formation electrolyte 220 is a saturated solution of LiFSI in the ionic liquid).

In some implementations, the SEI formation electrolyte 220 can be dry. As used herein, "dry" means having water content of less than 50 ppm. Water content values in all cases discussed herein can be measured by the Karl Fischer titration.

It will be noted that the first cell 210 of FIG. 1 is a symmetrical cell having two electrodes 200 of identical composition and that are alternatingly charged and discharged by reversible application of an external power source. It will be appreciated, however, that the forming an SEI step 110 can also be performed where the first cell 210 is a voltaic cell using the electrode 200 as an anode opposite an appropriate cathode, so long as the SEI formation electrolyte 220 is employed. In some implementations, the SEI forming step 110 can be performed by cycling the first cell 210 at 1 mAh·cm$^{-2}$ for at least 10 cycles.

The lithium electrode 200 can generally be any electrode suitable for use as an anode in a Li-ion voltaic cell. It will be understood that the term "anode", as used herein, refers to an electrode at which electrochemical oxidation occurs during discharge of a Li-ion voltaic cell and at which electrochemical reduction occurs during charging of a Li-ion voltaic cell. Similarly, the term "cathode", as used herein, refers to an electrode at which electrochemical oxidation occurs during discharge of a Li-ion voltaic cell and at which electrochemical reduction occurs during charging of a Li-ion voltaic cell. Thus, in some implementations, the lithium electrode 200 can be a lithium metal electrode, a graphite electrode, or any other electrode suitable for use as an anode in a Li-ion voltaic cell.

As shown in FIG. 1, the protected lithium anode 205 includes the lithium anode 200 with an SEI 206 that is formed during the forming an SEI step 110. As discussed below, the SEI 206 provides good Li-ion conductivity and also stabilizes the protected lithium anode 205 in the presence of water, enabling the protected lithium anode 205 to be used with a "wet" electrolyte.

The method 100 also includes a step 120 of assembling a wet Li-ion voltaic cell 300. The wet Li-ion voltaic cell 300 can include the protected lithium anode 205 opposite a cathode 310. The cathode 310 can be of any suitable cathode material. The wet Li-ion voltaic cell 300 further includes a wet electrolyte 320, in contact with the SEI 206 of the protected anode 205, and generally providing direct or indirect ionic communication between the protected anode 205 and the cathode 310. It will be appreciated that in certain test implementations, the wet Li-ion voltaic cell 300 can be a symmetric cell, having no cathode 310, but having opposing protected anodes 205 contacting the wet electrolyte 320 and connected to a reversible power supply 250.

The wet electrolyte 320 can generally be any electrolyte able to support lithium redox electrochemistry, and further including a significant proportion of water. Thus, in various implementations, the wet electrolyte can include water present at a concentration of: at least 50 ppm; or at least 100 ppm; or at least 200 ppm; or at least 300 ppm; or at least 400 ppm; or at least 500 ppm; or at least 600 ppm; or at least 700 ppm; or at least 800 ppm; or at least 900 ppm; or at least 1000 ppm; or at least 2000 ppm; or at least 3000 ppm; or at least 4000 ppm; or at least 16000. In some implementations, the wet electrolyte 320 can include water at any of the aforementioned minima, and with a maximum of 20000 ppm.

The dotted line labeled "O" in FIG. 1 represents taking the protected anode 205 out of the first cell 210 after completion of the forming an SEI step 110. Similarly, the dotted line labeled "I" represents putting the protected anode 205 into the wet voltaic Li-ion cell 300. Current collectors 260 are shown generically, and need not be of the same composition or structure.

The method 100 can optionally include a step of washing the protected anode 205, performed after the forming an SEI step 110 and before the assembly step 120. It will generally be desirable that such a wash step be performed with a solvent capable of at least partially solubilizing the SEI formation electrolyte 220. Suitable examples can include, but are not limited to, multi-dentate ethers (i.e. ether solvents having more than one ethereal oxygen), such as propylenecarbonate or dimethylcarbonate.

The method 100 can also include a step of operating the wet Li-ion voltaic cell 300. The operating step can be performed, for example, by connecting the wet Li-ion voltaic cell to a circuit and discharging, charging, or performing one or more charge/discharge cycles of the wet Li-ion voltaic cell 300.

Figure 3A:
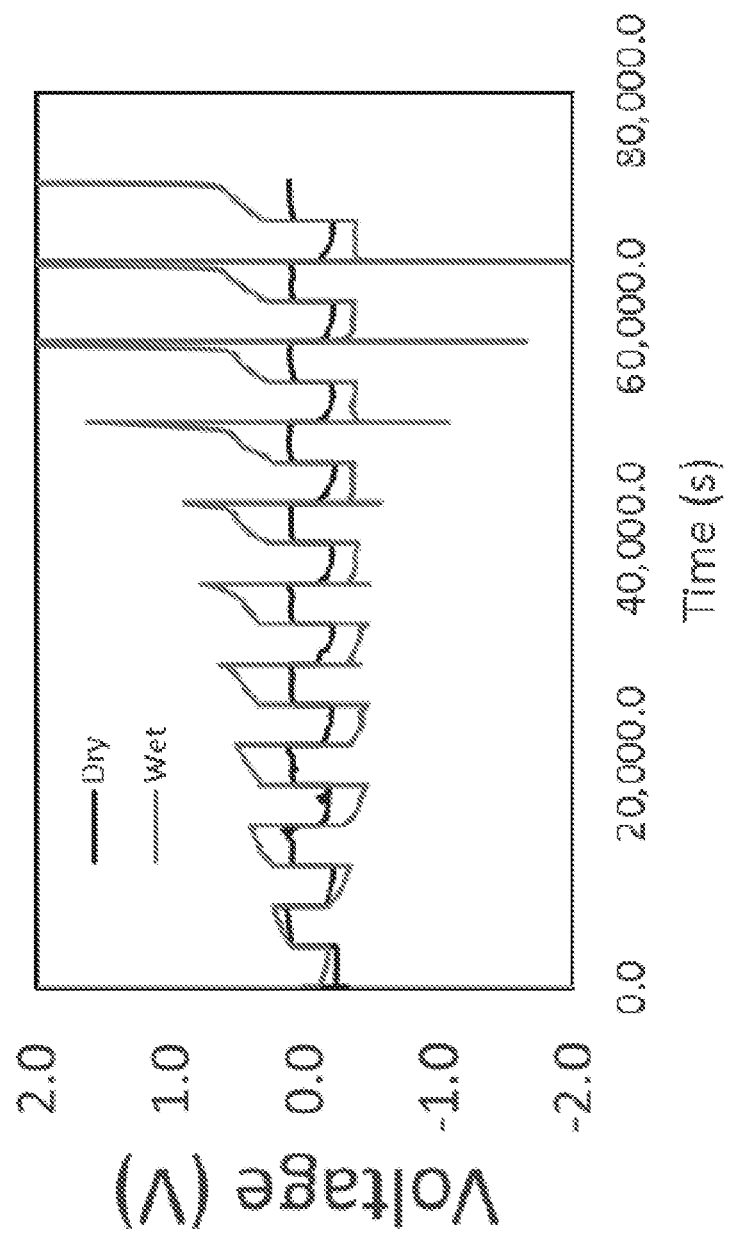
FIG. 3A is a plot of cell voltage vs. time during an SEI formation step in the method of FIG. 1 for two electrodes, using either a wet or a dry SEI formation electrolyte.

FIG. 3A shows a representative plot of electric potential as a function of time, produced during a step of forming an SEI, the step performed with two different SEI formation electrolytes: "Wet" and "Dry". Both SEI forming steps are performed with an electrode of lithium metal and an SEI formation electrolyte of 1:1 P$_{1222}$FSI:LiFSI. The "Wet" system further includes 1% water, by volume. The data clearly show that the overpotential substantially increases during the SEI formation step in the presence of water, and became significantly higher than that of the dry system.

Figure 3B:
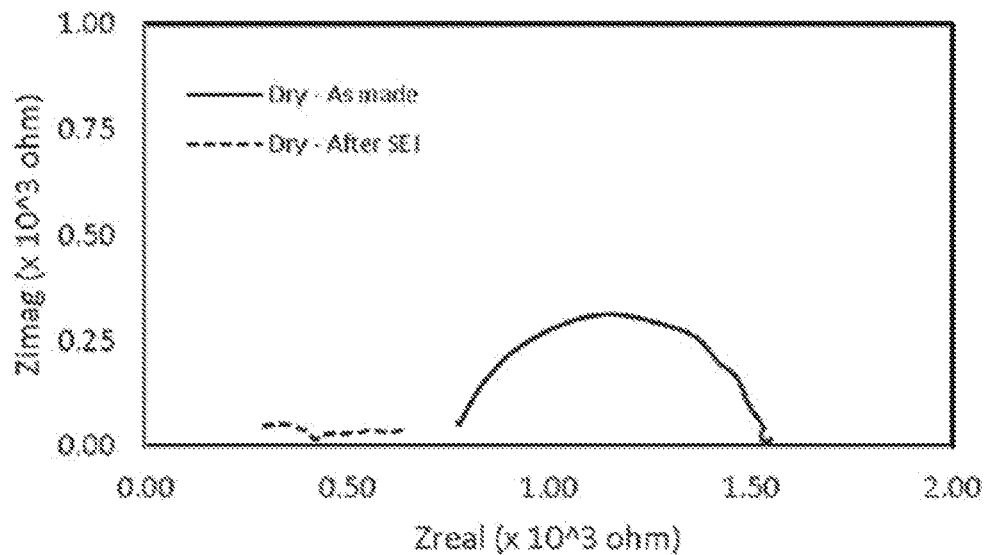
FIGS. 3B and 3C show Nyquist Impedance plots for the protected anodes produced by produced by the SEI formation steps of FIG. 3A.
Figure 3C:
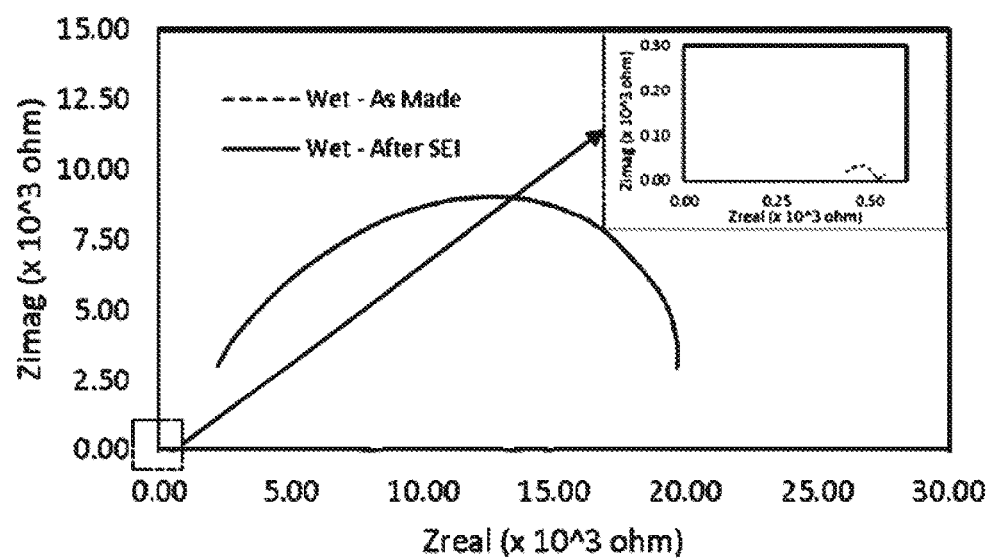

FIGS. 3B and 3C show Nyquist Impedance plots for the protected anodes produced by the SEI formation steps of FIG. 3A. Specifically, FIG. 3B shows an impedance plot for the protected anode produced by forming an SEI in the SEI formation electrolyte with 1% water, while FIG. 3C shows an impedance plot for the protected anode produced by forming an SEI in the SEI formation electrolyte that is dry. As shown in FIG. 3B, the protected anode produced by forming an SEI in the wet SEI formation electrolyte had a significant resistance increase in comparison to the corresponding electrode prior to forming an SEI (i.e. "as made"). As shown in FIG. 3C, the protected anode 205 produced by forming an SEI in the dry SEI formation electrolyte surprisingly had a decrease in resistance compared to the corresponding electrode prior to forming an SEI.

Figure 4A:
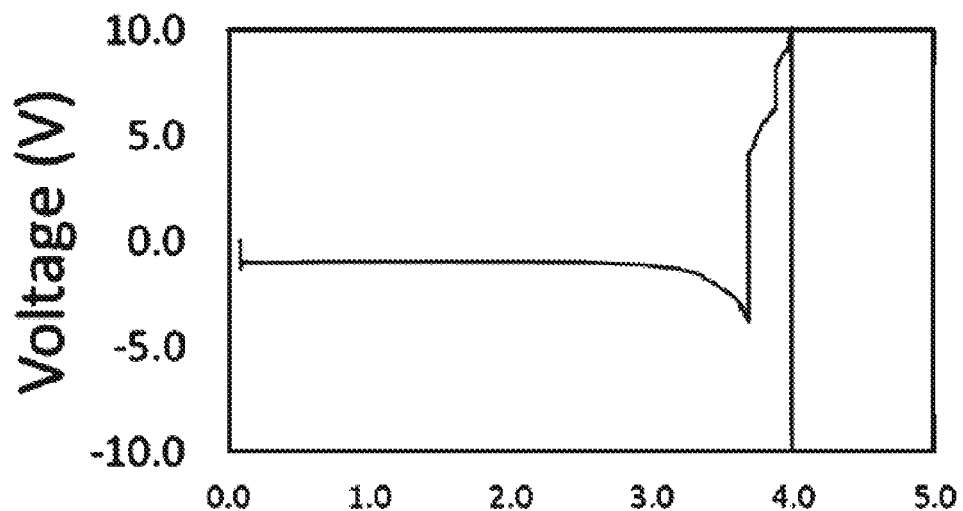
FIGS. 4A-4C show test data for three wet Li-ion voltaic cells made in accordance with the present teachings.
Figure 4B:
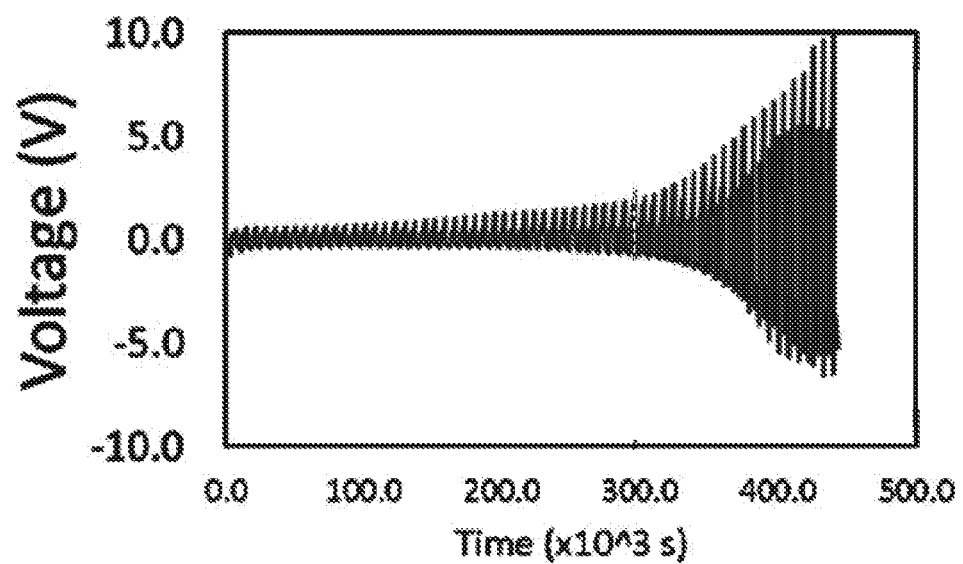
Figure 4C:
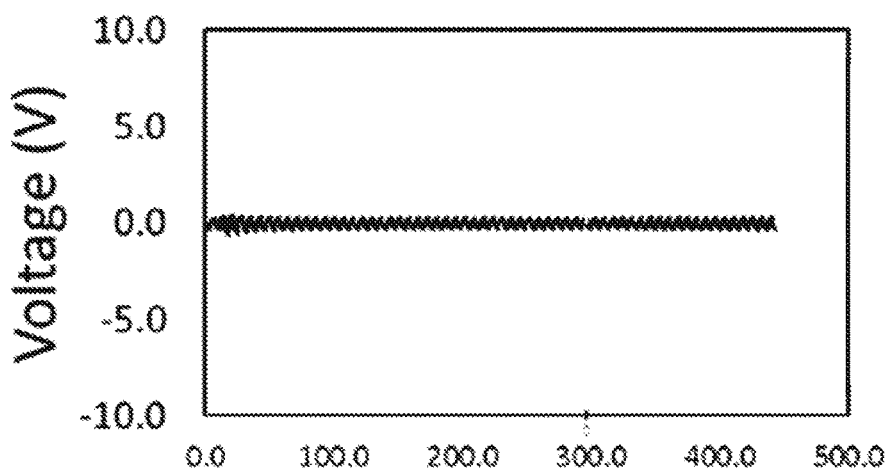

FIGS. 4A-4C show test data for three wet Li-ion voltaic cells. All test data are for wet lithium ion voltaic cells having two identical electrodes. The cell of FIG. 4A has unprotected electrodes; the cell of FIG. 4B has the protected anodes of FIG. 3A that are produced by forming an SEI in a wet SEI formation electrolyte; and the cell of FIG. 4C has the protected anodes of FIG. 3B that are produced by forming an SEI in a dry SEI formation electrolyte. The wet electrolyte for all three tests is 1 M Lithium bis(fluoromethylsulfonyl)imide (LiTFSI) in propylene carbonate (PC) with 1% water, by volume.

The cell of FIG. 4A, having unprotected electrodes, failed in the first cycle. The cell of FIG. 4B having protected anodes formed in the wet SEI formation electrolyte performed reasonably well for the first 300 seconds of cycling and then progressively proceeded toward failure. The cell 300 of FIG. 4C, having protected anodes formed in the dry SEI formation electrolyte, demonstrated excellent performance with low overpotential for the entire test duration of 1250 hours. These results clearly indicate that, while an SEI formed in a wet SEI formation electrolyte provides a significant degree of protection from water to the protected anode, SEI formation in a dry SEI formation electrolyte produces a superior result. In all remaining results, SEI formation is performed in a dry SEI formation electrolyte and protected anodes are washed in dimethyl carbonate.

Figure 5:
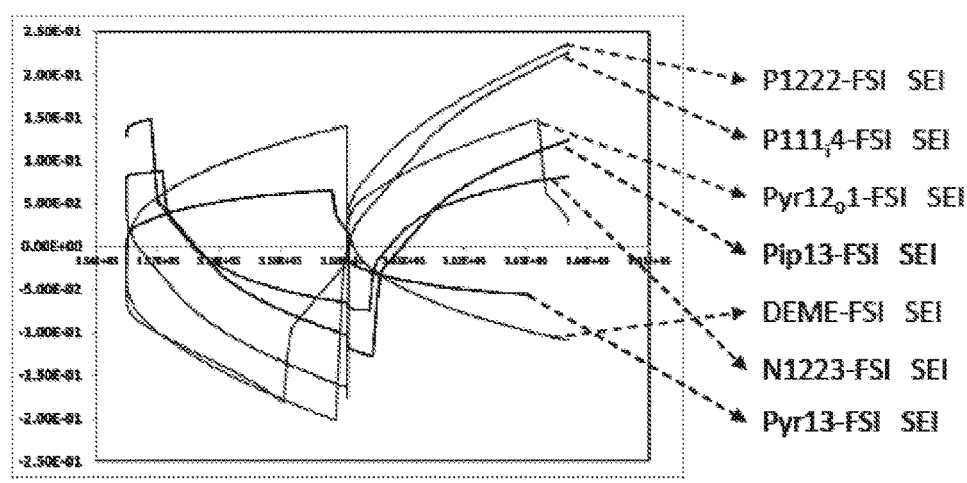
FIG. 5 shows a $50^{th}$ cycle of cells having seven different wet Li-ion voltaic cells.

FIG. 5 shows a $50^{th}$ cycle of seven different cells. The various cells of FIG. 5 are symmetrical cells as described above, and have protected anodes that were formed in seven different SEI formation electrolytes. Superiority of performance is determined by lowest overpotential, and provides a ranking of: Pyr13-FSI>N1223-FSI>DEME-FSI>Pip13-FSI>Pyr12$_O$1-FSI>P111,4-FSI>P1222-FSI. SEI formation using an SEI formation electrolyte having P1444-FSI is found to produce an SEI hat provided marginal protection to the protected anode (data not shown).

Figure 6A:
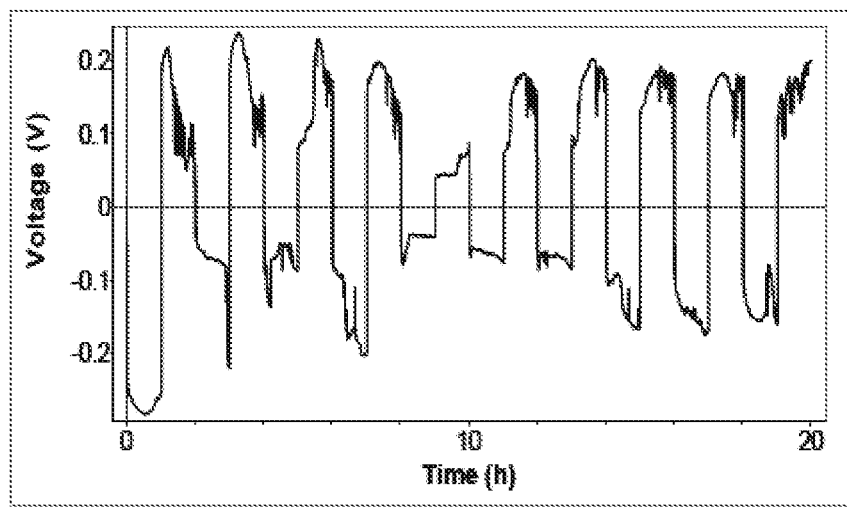
FIGS. 6A and 6B are voltammograms of an SEI formation step performed in SEI formation electrolytes having DEME-FSI and DEME-TFSI ionic liquids, respectively.
Figure 6B:
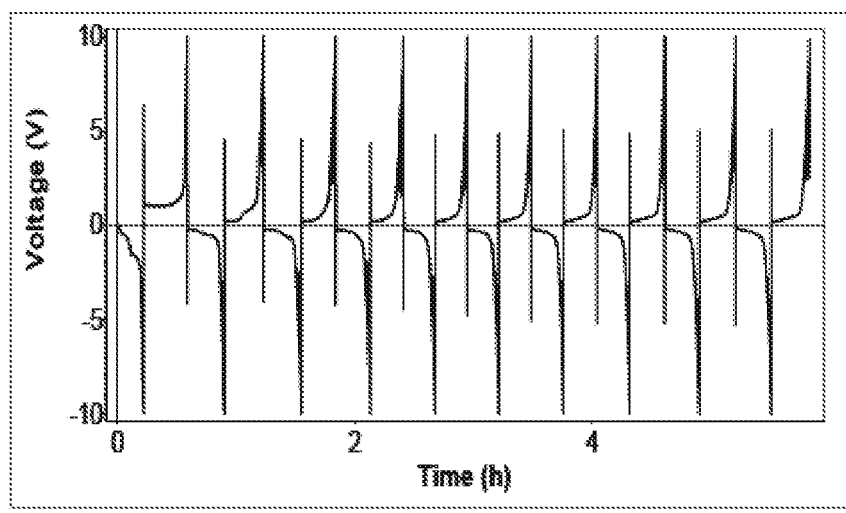
Figure 6C:
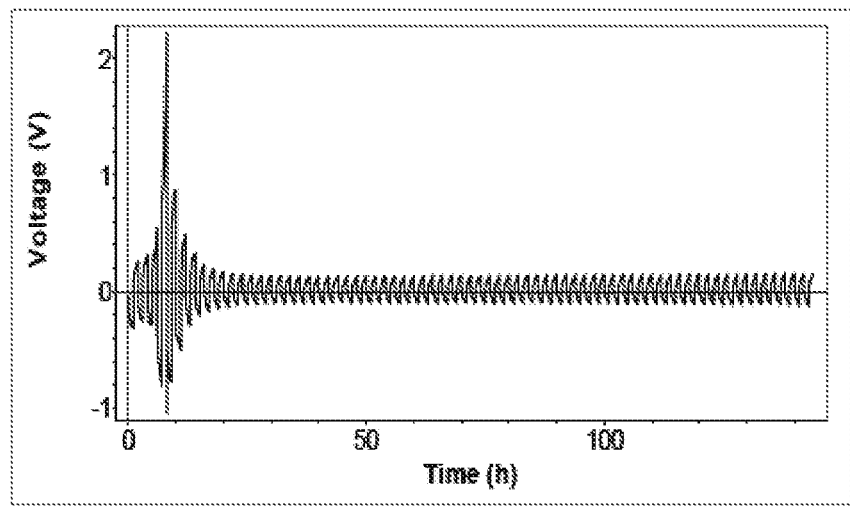
FIGS. 6C and 6D are plots of the cycling data for the wet Li-ion voltaic cells corresponding to FIGS. 6A and 6B, respectively.
Figure 6D:
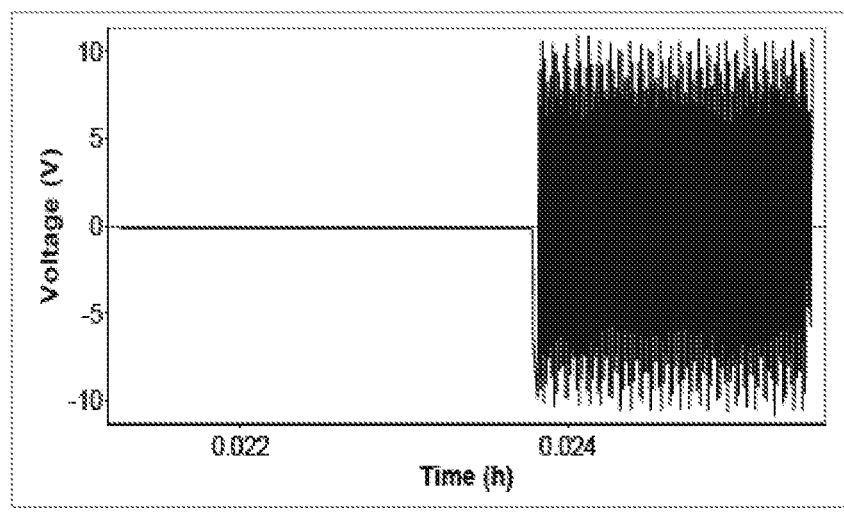

FIGS. 6A and 6B show voltammograms of SEI formation in SEI formation electrolytes DEMF-FSI and DEMF-TFSI, respectively. FIGS. 6C and 6D show the cycling data for the corresponding wet Li-ion voltaic cells, respectively. The results demonstrate that, unlike FSI, TFSI as the anion in the SEI formation electrolyte produces an ineffective SEI and a protected anode with poor performance. Similar inability to produce an effective SEI is found for SEI formation electrolytes having dicyanamide as anion (data not shown).

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A method for preparing a lithium-ion cell having a protected anode with a pre-formed solid electrolyte interphase (SEI), the method comprising:
    forming an SEI on a lithium electrode by performing multiple charge/discharge cycles on the electrode in a first cell having an SEI formation electrolyte to produce the protected anode, the SEI formation electrolyte comprising:
        lithium bis(fluorosulfonyl)imide (LiFSI); and
        an ionic liquid comprising:
            an organic cation selected from the group consisting of: 1-methyl-1-propylpyrrolidinium; N-methyl-N,N-diethyl-N-propylammonium; N,N-diethyl-N-methyl-N-(2-methoxyethyl)-ammonium; 1,1-methylpropylpiperidinium; N-methyl-N-(2-methoxyethyl)-pyrrolidinium; trimethylisopropylphosphonium; methyltriethylphosphonium; methyltributylphosphonium; and mixtures thereof; and
            a (fluorosulfonyl)imide anion (FSI)
    assembling a wet Li-ion voltaic cell comprising:
        the protected anode; and
        a wet electrolyte in contact with the protected anode, the wet electrolyte comprising at least 50 ppm water.

2. The method as recited in claim 1, wherein LiFSI is present at a molar ratio, relative to ionic liquid of: at least 1:1.

3. The method as recited in claim 1, wherein LiFSI is present at its saturation point in the ionic liquid.

4. The method as recited in claim 1, further comprising, prior to assembling the wet Li-ion voltaic cell, washing the protected anode with a solvent in which the SEI formation electrolyte is soluble.

5. The method as recited in claim 1, wherein the SEI formation electrolyte has a water content of less than 50 ppm.

6. The method as recited in claim 1, wherein the wet electrolyte comprises water present at a concentration of at least 100 ppm.

7. The method as recited in claim 1, wherein the wet electrolyte comprises water present at a concentration of at least 500 ppm.

8. The method as recited in claim 1, wherein the wet electrolyte comprises water present at a concentration of at least 1000 ppm.

9. The method as recited in claim 1, wherein the wet electrolyte comprises water present at a concentration of at least 4000 ppm.

10. The method as recited in claim 1, wherein the wet electrolyte comprises water present at a concentration of at least 16000 ppm.

11. The method as recited in claim 1, wherein the cation comprises Pyr13.

12. The method as recited in claim 1, wherein the cation comprises N1223.

13. The method as recited in claim 1, wherein the cation comprises DEME.

14. The method as recited in claim 1, wherein the cation comprises Pip13.

15. The method as recited in claim 1, wherein the cation comprises $P111_i4$.

16. The method as recited in claim 1, wherein the cation comprises $Pyr12_o1$.

17. The method as recited in claim 1, wherein the cation comprises P1222.

18. The method as recited in claim 1, wherein the cation comprises P1444.

* * * * *